United States Patent [19]
Frey et al.

[11] Patent Number: 5,557,513
[45] Date of Patent: Sep. 17, 1996

[54] CHECKOUT LANE ALERT SYSTEM AND METHOD FOR STORES HAVING EXPRESS CHECKOUT LANES

[75] Inventors: Ronald G. Frey, Hackensack; John D. Nelson, Middletown, both of N.J.

[73] Assignee: Quadrix Corporation, Bensenville, Ill.

[21] Appl. No.: 262,131

[22] Filed: Jun. 17, 1994

Related U.S. Application Data

[63] Continuation-in-part of Ser. No. 54,710, Apr. 28, 1993.
[51] Int. Cl.⁶ ....................................... G06F 19/00
[52] U.S. Cl. ....................................... 364/401 R
[58] Field of Search ............................ 364/401, 402, 364/405, 550, 569; 377/6; 186/35, 52

[56] References Cited

U.S. PATENT DOCUMENTS 3,808,410  4/1974  Schlesinger .
4,536,842  8/1985  Yoneda et al. .
4,700,295  10/1987  Katsof et al. .
5,138,638  8/1992  Frey .
5,388,165  2/1995  Deaton et al. ........................ 382/7
5,390,107  2/1995  Nelson et al. ...................... 364/401

*Primary Examiner*—Donald E. McElheny, Jr.

[57] ABSTRACT

A checkout lane alert system and method is a live, computer base, in-store system that integrates real time shopper traffic data with computerized statistical analysis to generate accurate short term forecasts of shopper traffic at the checkout lanes of the store. Shopper entry time data from a recognition system is used in the analysis. The system combines real time data with pregathered statistical data about the population that shops in a particular type of store and data which characterizes the checkout lane throughput capability for the store to predict checkout lane traffic and staffing requirements. The system of the present invention is adapted for use in stores having express and non-express checkout lanes.

11 Claims, 16 Drawing Sheets

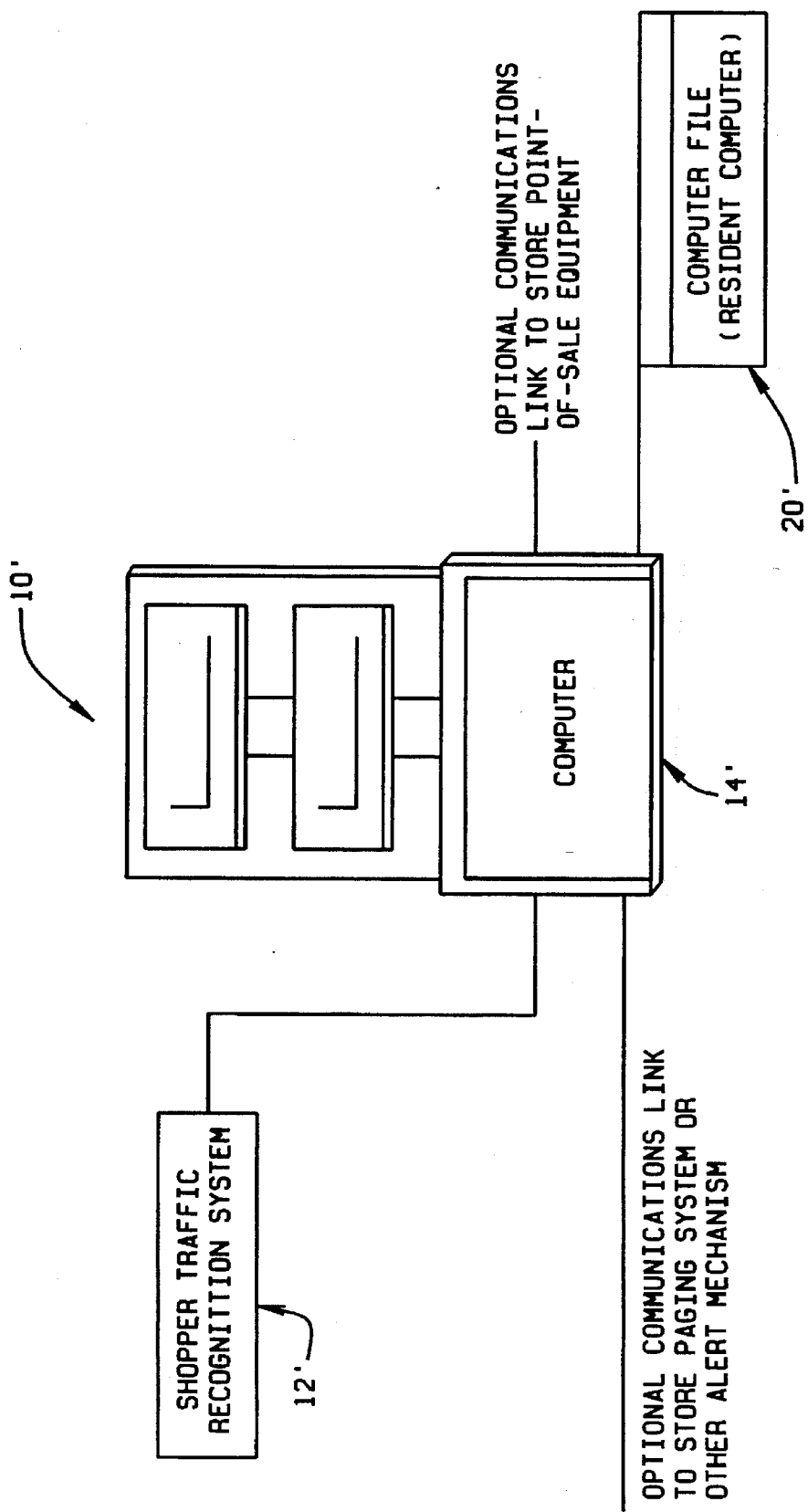

| RECENT HOURS TRAFFIC | |
|---|---|
| 4:00 AM | 0 |
| 5:00 AM | 0 |
| 6:00 AM | 0 |
| 7:00 AM | 19 |
| 8:00 AM | 141 |
| 9:00 AM | 370 |
| 10:00 AM | 450 |
| 11:00 AM | 420 |
| 12:00 PM | 10 |
| 1:00 PM | 0 |

TOTAL TRAFFIC: 1422

FORECAST OF NORMAL LANES NEEDED FOR OPTIMAL SERVICE

NORMAL LANES: 12, 11, 10, 9, 8, 7
(11:40 PM, 11:50, 12:00 PM, 12:10, 12:20 PM)

FORECAST OF EXPRESS LANES FOR OPTIMAL SERVICES

EXPRESS LANES
(11:40 PM, 11:50, 12:00 PM, 12:10, 12:20 PM)

CURRENT ALERT MESSAGES

NORMAL LANES
HOLD AT 9 LANES

EXPRESS LANES
HOLD AT 2 LANES

LANES SUGGESTED

| 12:00 PM | 12:10 PM |
|---|---|
| 10 | 2 |
| NORMAL | EXPRESS |

STORE ENTRIES

LAST 30 MINUTES
214

CHECKOUT LANE ALERT SYSTEM AND METHOD FOR STORES HAVING EXPRESS CHECKOUT LANES

CROSS-REFERENCE TO RELATED APPLICATIONS

This application is a continuation-in-part of Applicant's application Ser. No. 08/054,710, filed Apr. 28, 1993, entitled "Checkout Lane Alert System And Method".

BACKGROUND AND SUMMARY OF INVENTION

The invention disclosed in the parent relates to a computer system and method for forecasting the traffic at checkout lanes in mass merchandising stores, department stores, grocery stores, and other applications to give management sufficient time to properly staff the checkout lanes to maximize labor efficiency and customer satisfaction. The present invention improves upon the parent by providing a computer system and method for forecasting the checkout lane traffic in stores having both express checkout lanes and non-express checkout lanes.

Traditionally, the systems used by store management to staff checkout lanes have been "reactive". By visually observing the length of the checkout lines management would adjust the number the checkout personnel as needed. There are a number of problems associated with this approach. The store manager does not always notice an increase in lines until after customers have experienced excessive waiting in the lines. The result is customer dissatisfaction with the store and a substantial likelihood of lost sales. There appears to be a direct relationship between the number of purchases a customer will make and the length of the checkout lines. There also appears to be a relationship between whether a customer will shop in a particular store and the length of the store's checkout lines. Of course, the problem can be alleviated by over staffing the checkout lanes, but this results in a waste of store personnel and increased overhead that reduces profits. Moreover, in many stores checkout personnel have other duties when they are not working at the registers, so even when the manager observes excessive checkout lines, it takes some period of time to bring additional employees on to the registers from their present duties. In the meantime, customers become irritated and dissatisfied with a potential loss of business.

Another problem experienced with the reactive approach is that from a customer relations point-of-view it is easier for the store management to open checkout lanes than to close them. Once a lane is open, management tends to keep the lane open for some period of time even if lane traffic diminishes resulting in an inefficient use of store personnel.

The checkout lane alert system disclosed in the parent overcomes these problems by providing a "proactive" computer system and method that predicts lane traffic in the store and gives the store manager advance notice so that adjustments in checkout lane staffing can be made that will prevent excessive checkout lines and excessive checkout lanes. So rather than wait for the lines to begin building, and then reacting to the build up, the system and method of this invention forecasts the staffing requirement and allows proper staff deployment before a build up begins. While traditional methods are mostly static in that staff levels are predetermined, the invention disclosed in the parent allows for dynamic staffing of the checkout lanes for more efficient allocation of labor.

The checkout lane alert system disclosed in the parent is a live, computer-based, in-store system that integrates real-time shopper traffic data with computerized statistical analysis in order to generate accurate short term forecasts of shopper traffic at the checkout lanes of the store. The system uses up to the minute traffic data to create its forecast and allows a retailer to track the momentary surges in lane traffic and meet these with the proper staffing.

Generally, the system disclosed in the parent comprises a person and object recognition system component and a computer system running appropriate software. The recognition system "recognizes" the potential shoppers as they enter and leave the store by recognizing persons or objects as they move past a selected location in the store and classifying the persons or objects in accordance with selected criteria. Such a recognition system is disclosed in Frey, U.S. Pat. No. 5,138,638, the entirety of which is incorporated herein by reference, and is further disclosed in U.S. patent application Ser. No. 07/855,503, filed Mar. 20, 1992, entitled "Person and Object Recognition System", (the entirety of which is incorporated herein by reference) which is a continuation-in-part of the application which issued into U.S. Pat. No. 5,138,638. The two components are connected by a cable that allows communication of the shopper traffic data from the recognition system to the computer in real-time.

The computer that is connected with the recognition system runs the software for the invention disclosed in the parent. This software allows the computer to retrieve the shopper entry and exit time data from the recognition system for use in its statistical analysis. The software combines this real-time data with pregathered statistical data about the population that shops in a particular type of store, and data which characterizes the checkout lane throughput capability for a store. Each minute the software performs many simulations which combine these factors in different ways in order to forecast the shopper traffic at the checkout lanes for that minute and minutes that follow. The computer screen graphically displays the forecast, and the system updates the screen display with results of the simulations and alerts store personnel when lane traffic will increase or decrease to a point where a new checkout lane staffing level is needed.

The system disclosed in the parent uses two pieces of information about the shopping population in the store. The first is called the "conversion rate" which is the ratio of shoppers who actually buy an item or items to the total shoppers in the store. This information is used to estimate the percentage of the total entering shoppers that will actually visit the checkout lanes. The second piece of information concerns the amount of time the shopper spends in the store. This information allows the system to forecast the arrival time of each shopper at the checkout lane. The system uses a frequency distribution of the shopping times of shoppers in the store. During each simulation performed by the system, shoppers are assigned pseudo-random shopping times based on the frequency distribution. During the many repetitions of the simulation, shoppers will be assigned different random combinations of shopping times and the final forecast is the average of the simulations.

The system disclosed in the parent also uses "optimal" service criteria for a particular store and a frequency distribution of shopper checkout times (how long it takes for a shopper to check out once the shopper reaches the register) to determine the number of checkout lanes required once the lane traffic is forecast. The frequency distribution of checkout times is pregathered automatically from the store point-of-sale (POS) checkout equipment.

The present invention improves on the invention disclosed in the parent by providing a "proactive" computer system and method that predicts checkout lane traffic in stores having both express checkout lanes and non-express checkout lanes and gives the store manager advance notice so that adjustments in express checkout lane staffing and non-express checkout lane staffing can be made. Generally, the system of the present invention comprises a person and object recognition system and a computer system running appropriate software. The recognition system "recognizes" shoppers when they enter and leave the store as described above as well as in Frey, U.S. Pat. No. 5,138,638 and U.S. pending parent application Ser. No. 07/855,503, previously referred to. The recognition system is connected to the computer to accomplish real-time communication of shopper traffic to the computer. The software combines this real-time data with pregathered statistical data about the shopping population of a particular store, and data characterizing the express checkout lane and non-express checkout lane throughput capability for the store.

Each shopper recognized by the recognition system is assigned a number of items which he/she will purchase in the store. The number of items that each shopper purchases is a random variable selected based on a frequency distribution curve. The shopping time of each shopper is then obtained by multiplying the number of items expected to be purchased by a set multiplier.

Based on the number of items a shopper is predicted to purchase, when the shopper arrives at the checkout lane (calculated by adding the shopper entry time and estimated shopping time), he/she has the option of choosing an express checkout lane or a non-express checkout lane. Shoppers with a predetermined number of items or fewer are "express-eligible" and may select an express lane. While express lanes are designed to minimize checkout time for shoppers with relatively few items, express-eligible shoppers may select any checkout lane. The system allows a store manager to select the percentage of express-eligible shoppers who actually use an express lane. Shoppers with more than the predetermined number of items must select a non-express lane. The software of the present invention treats the two lane types differently with respect to staffing criteria and traffic flow. At the conclusion of a shopper's estimated shopping time, each shopper is added to an appropriate checkout lane.

The software of the present invention combines the shopper entry data, items purchased and estimated shopping times, and exit time data with pregathered or selected statistical data about the shopping population of a given store and the express and non-express checkout lane throughput of a given store. Each minute the software performs many simulations combining these factors to forecast shopper traffic at the express and the non-express checkout lanes. During each simulation performed by the system, shoppers are assigned a pseudo-random number of items purchased which is converted into an estimated shopping time. During the many repetitions of the simulations, shoppers will be assigned different random combinations of items purchased, and corresponding shopping times, and the final forecast is the average of the simulations. The computer screen graphically displays the express and non-express traffic lane forecasts. The system updates the screen display with results of the simulations and alerts store personnel when express and/or non-express lane traffic will increase or decrease to a point where new checkout staffing is needed.

DESCRIPTION OF THE DRAWINGS

In the accompanying drawings which form a part of the specification and are to be read in conjunction therewith, and in which like reference numerals are used to indicate like parts:

FIG. 10 is a schematic illustrating the system of the present invention.

FIGS. 11 and 12 are typical screen displays for the system of the present invention.

DETAILED DESCRIPTION OF A PREFERRED EMBODIMENT

Figure 1:
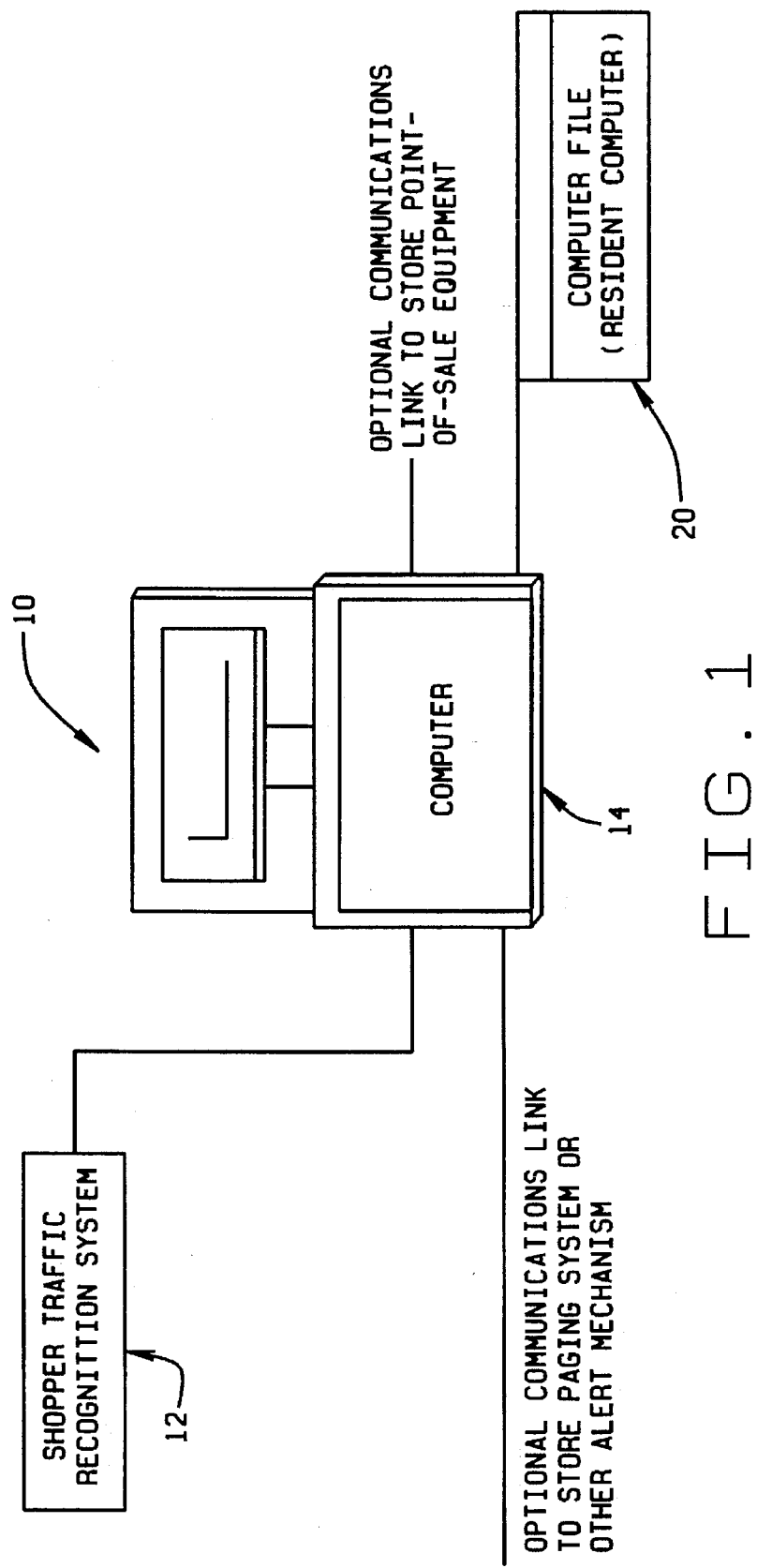
FIG. 1 is a schematic illustrating the system of the invention disclosed in the parent.

With reference to FIG. 1, there is shown a checkout lane alert system 10 of the invention disclosed in the parent comprising a shopper traffic recognition system 12, and a computer 14. The recognition system 12 preferably is of the type disclosed in U.S. Pat. No. 5,138,638 and U.S. pending patent application Ser. No. 07/855,503, previously referred to. The recognition system determines the number of shopper units that enter the store, a "shopper unit" being defined as a person expected to make purchases in the store. The recognition system comprises one or more sensors that may be mounted above the store entry and exit doorways. When a person or object passes beneath these sensors, the system measures the height, speed, and length of the person or object and generates signals representing a time-dependent height profile of the person or object as the person or object moves past the sensor. These signals are transmitted to a signal processor, and from there to a central processing unit which processes the signals and generates data representing the number of persons or objects in pre-selected categories. The system also determines the direction of movement of the person or object (in or out of the store). From a comparison with selected criteria, the system determines whether a particular person entering the store is a potential buyer as opposed, for example, to a small child who is not likely to buy or an object such as a shopping cart.

When a shopper who is a potential buyer enters or exits through a doorway monitored by the recognition system 12, the recognition system records the time of the event and stores that information in an internal memory buffer so that the information is accessible to the computer 14.

The computer 14 runs the software for the checkout lane alert system and allows the computer to retrieve the shopper entry time data from the recognition system 12 for use in its statistical analysis. As will be further explained, the software combines the real-time data with pregathered statistical data about the population that shops in a particular type of store and data which characterizes the checkout lane throughput capability for the store to predict checkout lane staffing requirements.

The system further comprises an optional communications link to a store paging system or other alert mechanism to alert store management of the need to change lane staffing, and an optional communications link to the store point-of-sale (POS) equipment for a real-time update of store parameters which may be used by the checkout lane alert software. These parameters may include shopping time, checkout processing time, and conversion rate, which are stored in a computer file 20 resident in the computer.

Figure 2:
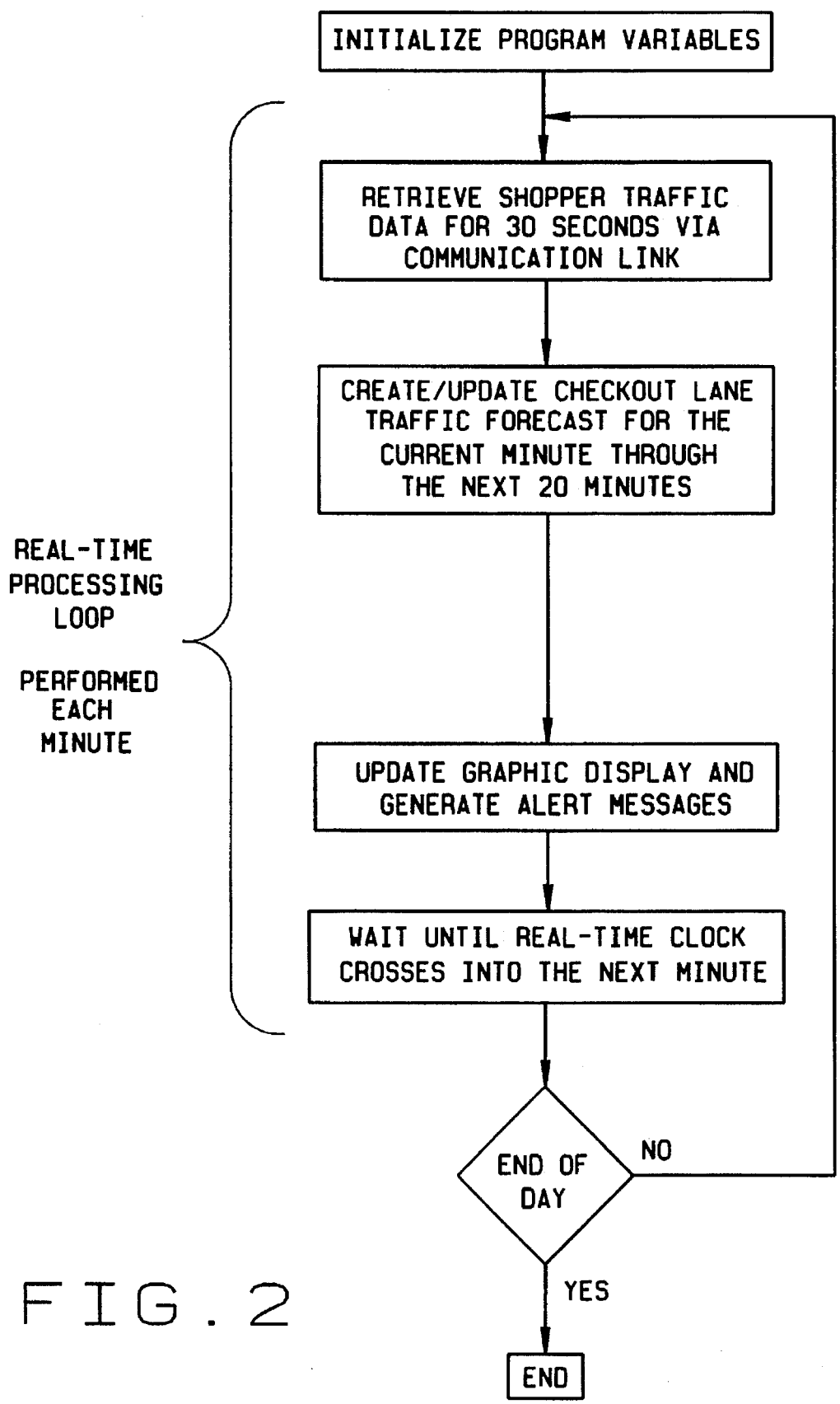
FIGS. 2–5 are flow diagrams of the system of the invention disclosed in the parent.

FIG. 2 shows the general flow diagram for the checkout lane alert system of the invention disclosed in the parent. It is a real-time processing loop which is called one time every minute that the program operates. The module creates a forecast of checkout lane arrivals for the current minute through the next 20 minutes. A shorter or longer forecast time may be used, but the accuracy of the forecast diminishes the greater the forecast time. A forecast period of 20 minutes has been found to provide acceptable accuracy which sufficient length to satisfy store conditions. In accordance with the program, the shopper traffic data from the recognition system 12 for a period of 30 seconds is retrieved through the communication link. The lane alert system 10 then creates and updates a checkout lane traffic forecast for the current minute through the next 20 minutes. This will be described in more detail with reference to the flow diagrams of FIGS. 3–5. From data representing the updated forecast, an updated graphic display of the traffic forecast is generated along with alert messages for lane staffing requirements. This processing is repeated during each minute in real-time.

Figure 3A:
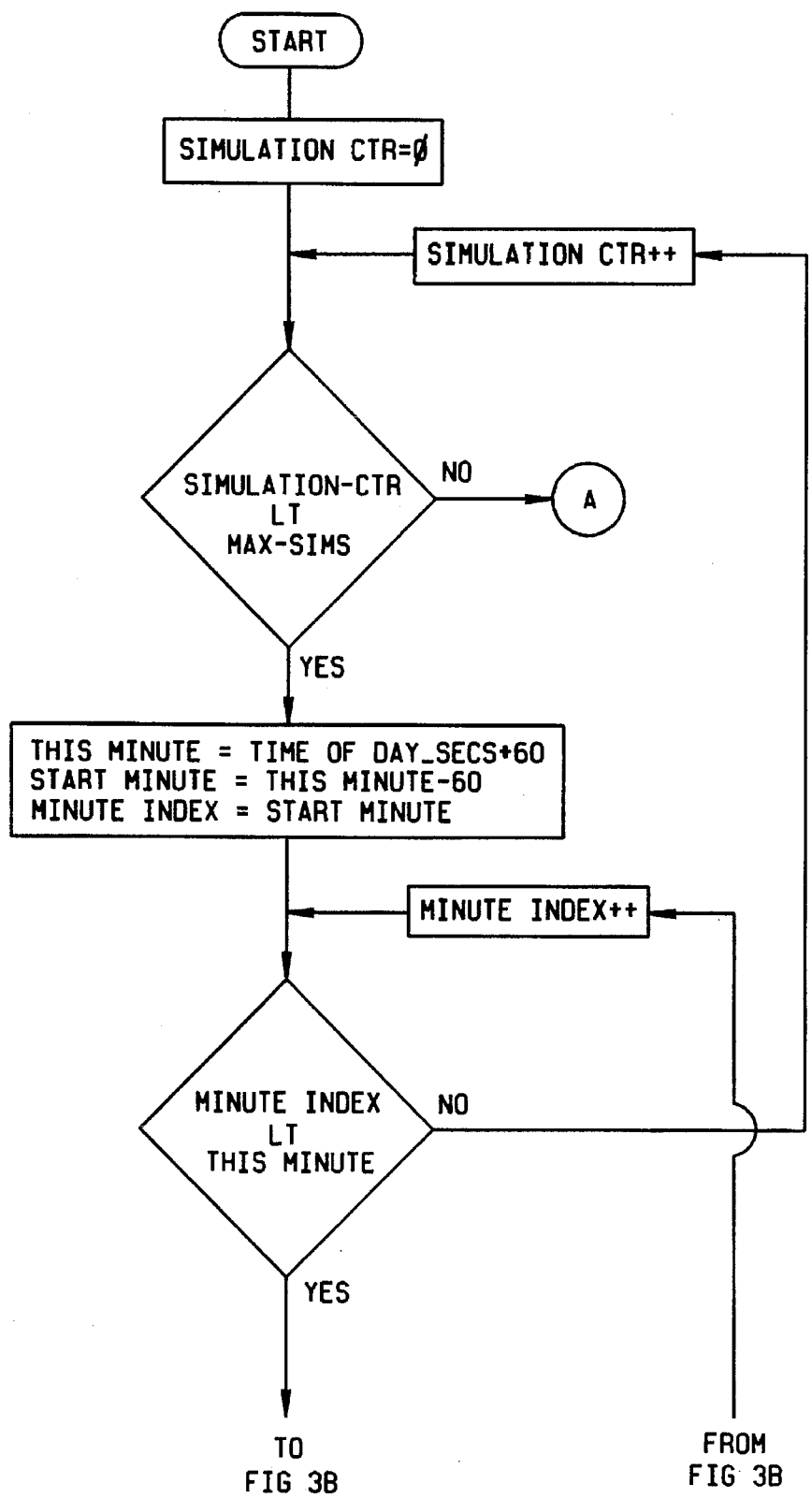
Figure 3B:
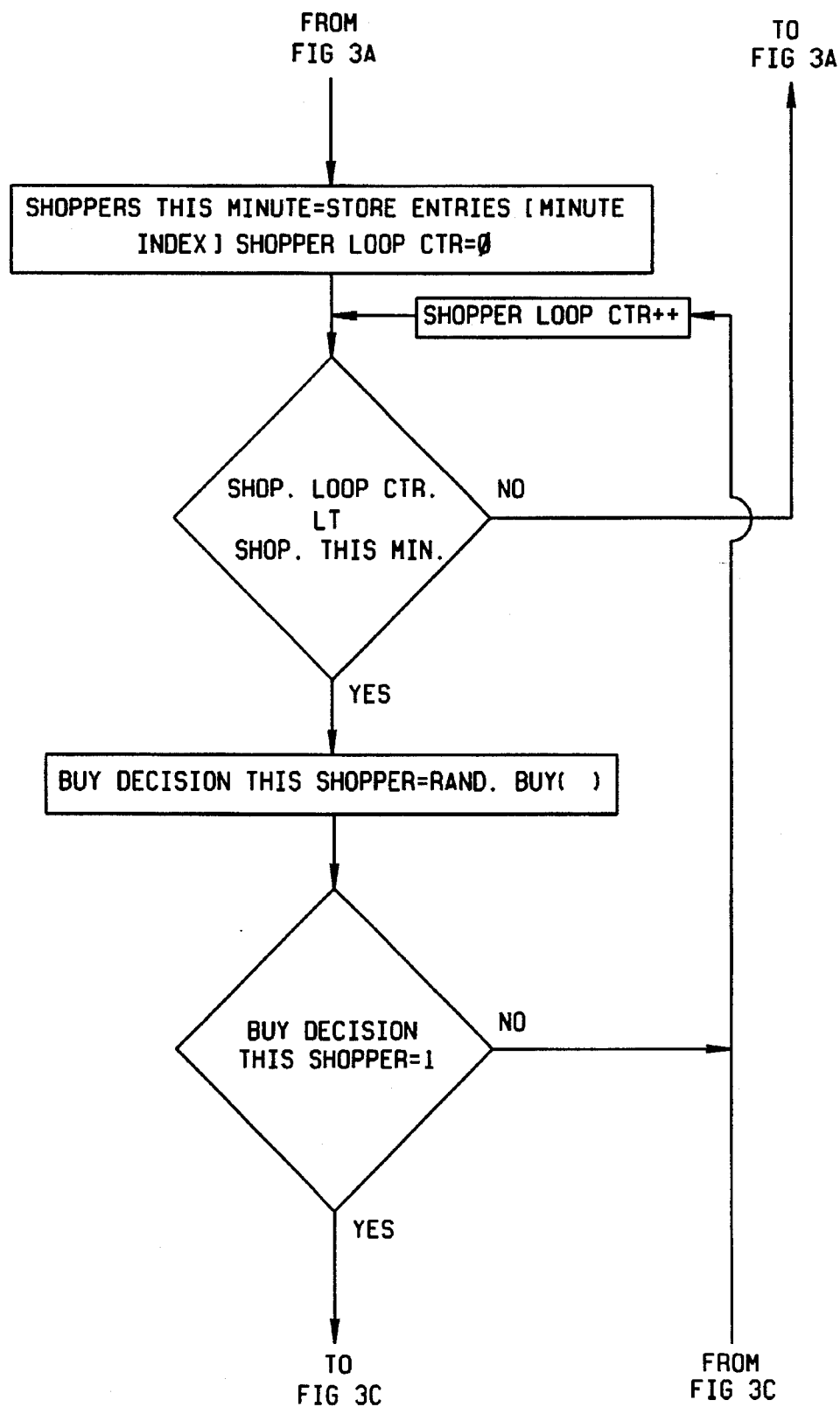
Figure 3C:
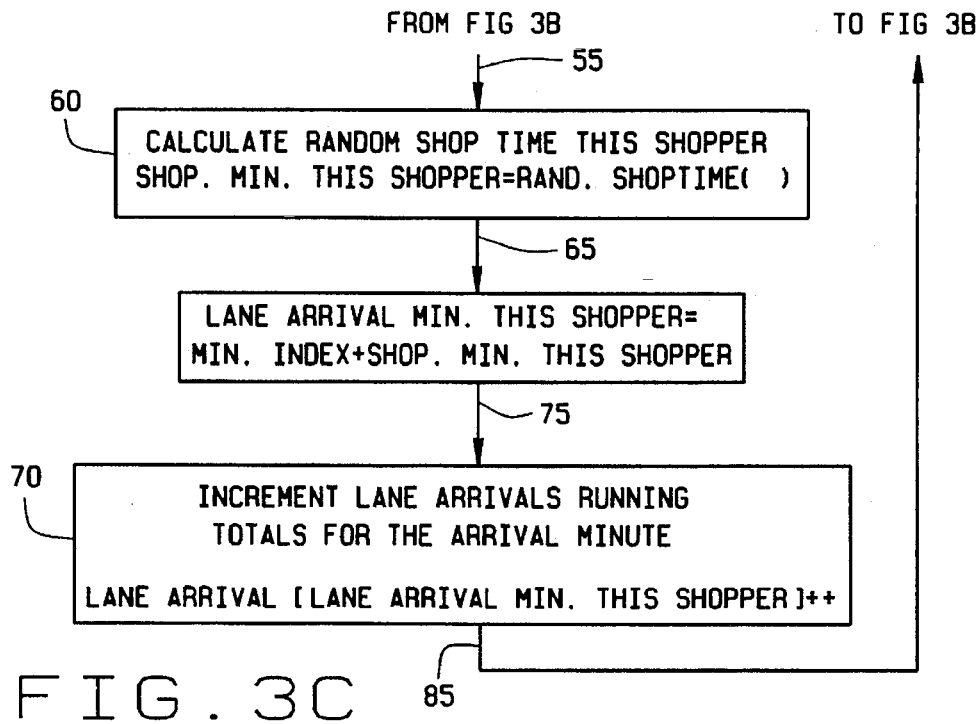
Figure 4:
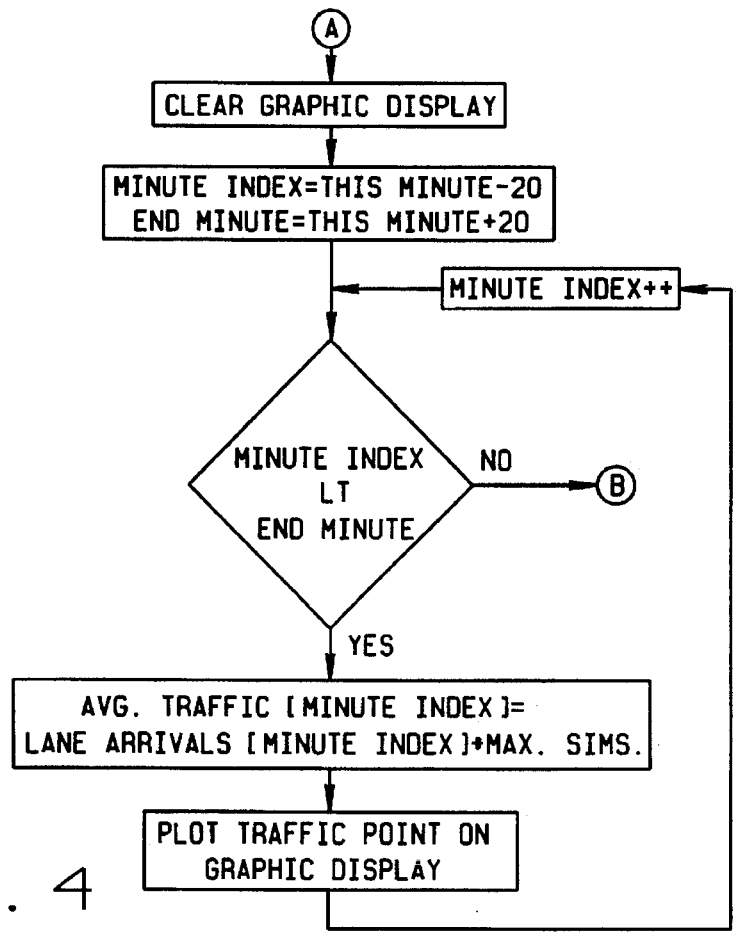
Figure 5A:
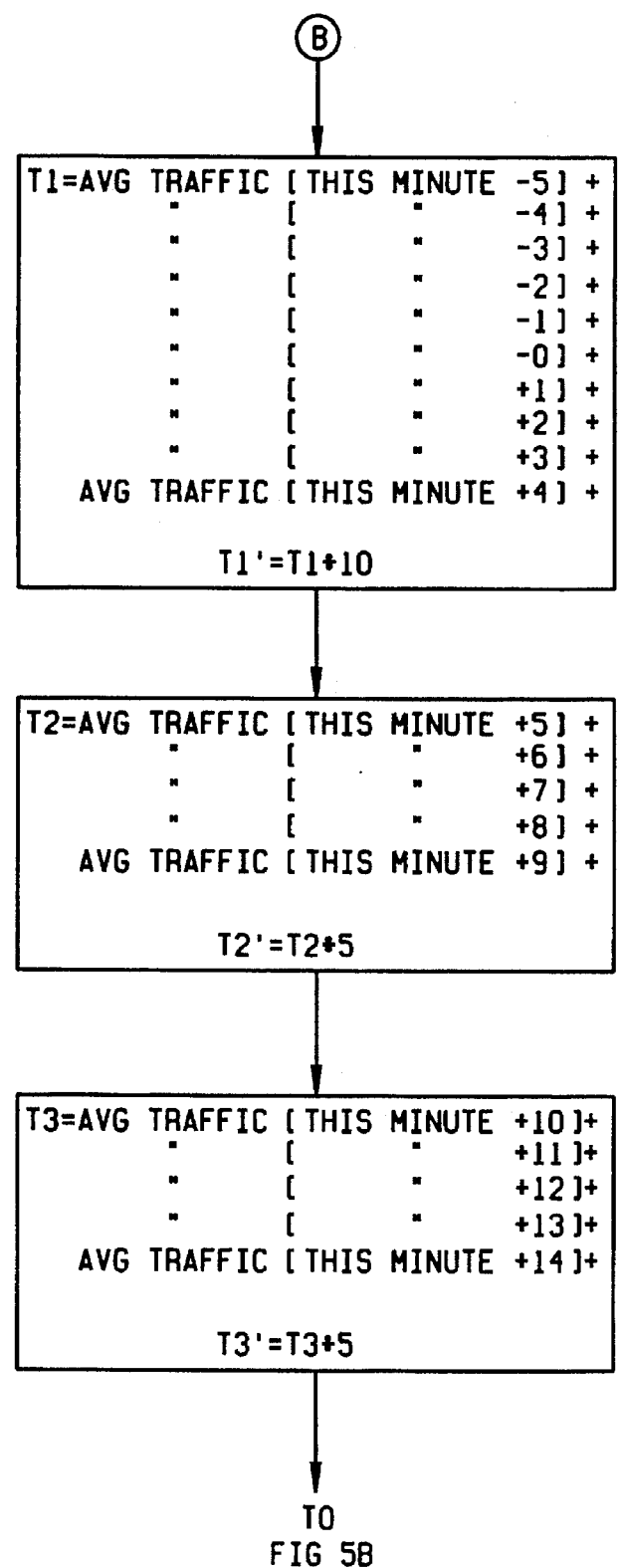
Figure 5B:
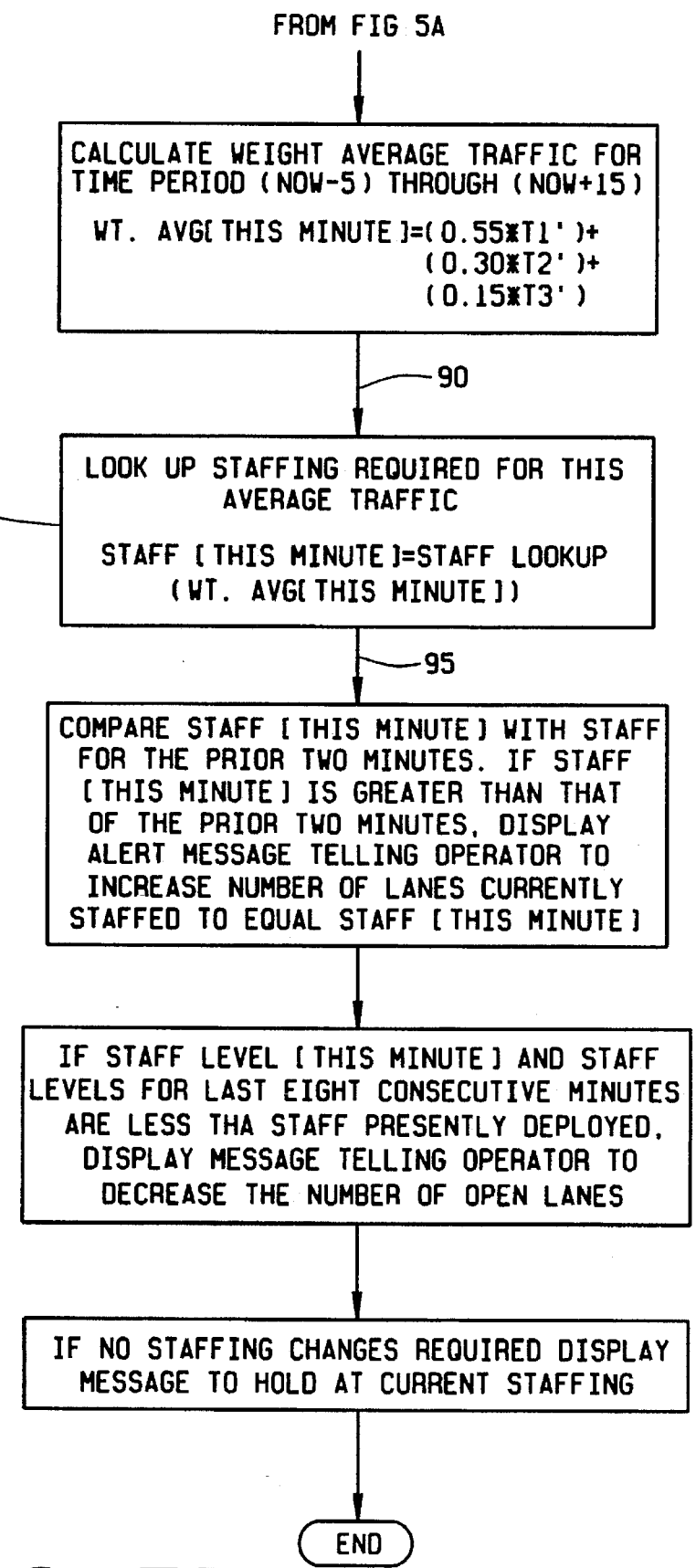

The portion of the diagram of FIG. 2 for creating and updating the checkout lane traffic forecast for each minute from the current minute through the next 20 minutes is shown in more detail by the flow charts of FIGS. 3–5. Referring to FIG. 3A, the system computes a large number of simulations during each minute for purposes of updating the display. In the parent, the number of simulations is disclosed as preferably 200, although a fewer or greater number may be used. It has been found that under most conditions 200 simulations is sufficient to provide reliable data for updating the display. So during each current minute the lane alert system operates in real-time to update shopper entry information from the recognition system 12 and compute 200 simulations for updating the display. The process for performing the simulations will now be described.

During each update the system goes back 60 minutes, and for each minute of the past 60 minutes the recognition system has stored information on the shoppers who entered the store during that minute. For each such shopper it determines whether the shopper is a "buyer" or a "no-buyer" based on a "conversion rate". The conversion rate is the rate at which shoppers turn out to be buyers. In other words, it is the percentage of shoppers that are buyers. Obviously, this percentage changes over time and from store to store, and in some cases from shift to shift. The conversion rate is computed from data generated by the recognition system 12 representing the time and event of each shopper leaving the store during a given time interval, and data from the store's POS system representing the time and event of each buyer that checks out through a checkout lane during that same time interval. The POS system registers each transaction at the checkout and records the time of the transaction. A "transaction" is represented by a single buyer checking out through a checkout lane, and not by the number of purchases. So with the data from the POS system on the number of transactions over a particular time period, and data from the recognition system on the number of shoppers exiting the store over the same time period, the conversion rate is computed as the number of transactions divided by the number of shoppers exiting the store. For example, if 100 people leave the store during that period, and there are 36 transactions, the conversion rate is 36% meaning that 36% of the shoppers in the store were buyers. Hence, the conversion rate is really a load factor as far as checkout staffing requirements are concerned. The checkout personnel do not have to serve every shopper, but rather only those shoppers who buy.

It has been found that the conversion rates are relatively constant for a given day and shift so it is possible to average those conversion rates and use the average rate for a given day and shift for purposes of the forecast. The conversion rate can be computed with greater granularity if desired, such as for each hour of each day, but that degree of granularity may not be necessary. As another alternative, the system may compute the conversion rate from a frequency distribution bell curve of conversion rates using data from the recognition system 12 and the store POS system with the lane alert system running a number of simulations by randomly selecting conversion rates from the bell curve and then averaging those results to give final predictions. However, it has been found that in most cases the first method described above, using a single average of conversion rates, will suffice.

For each shopper entering the store during each minute of the past 60 minutes as recognized by the recognition system 12, the system 10 designates the shopper as either a "buyer" or a "no-buyer" based on the determined conversion rate. For example, if the conversion rate is 36%, there is a 36% chance that the shopper will be designated as a buyer, and a 64% chance that the shopper will be designated as a no-buyer (FIG. 3B).

Figure 6:
FIG. 6 is a typical frequency distribution of shopping times used in the system of the invention disclosed in the parent.
Figure 8:
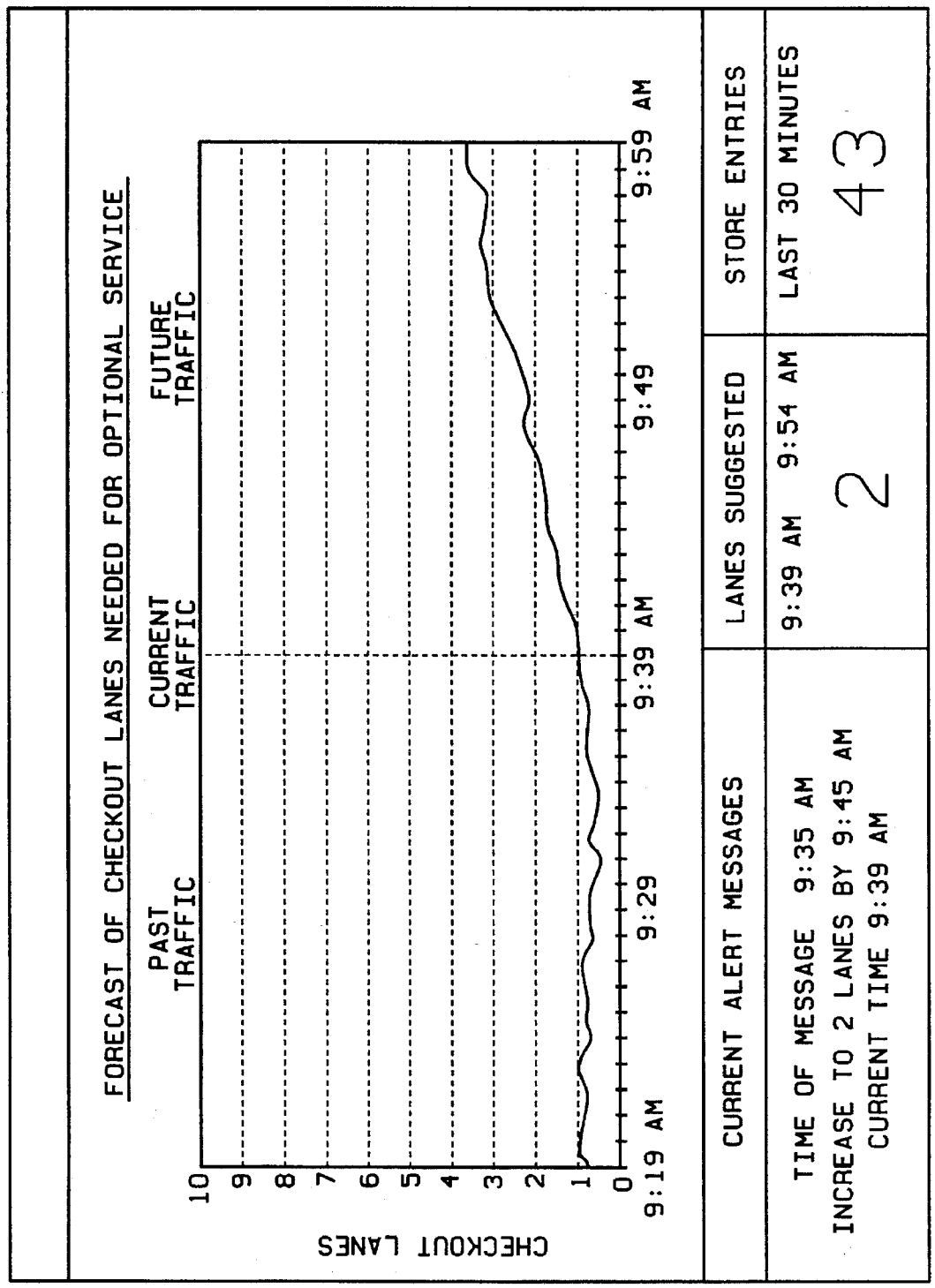
FIG. 8 is a typical screen display for the system of the invention disclosed in the parent.

As shown in FIG. 3C, if the shopper is designated as a buyer, the shopper is assigned an arbitrary value of shopping time at 60 from a bell curve, such as that of FIG. 6, from which the shopper's minute arrival time at the checkout lane is calculated. The minute arrival time is the minute index (the time the shopper entered the store as detected by the recognition system) plus the shopping time randomly assigned from the bell curve. This process is repeated for each successive shopper that entered the store during the first minute of the past 60 minutes, and then is further repeated for each successive shopper that entered the store during each successive minute during the past 60 minutes. Finally, the process is then repeated 200 more times, each time beginning with the first shopper entry of the first minute and ending with the last shopper entry of the last minute until all 200 additional cycles are completed. With each cycle each shopper entry is designated as a "buyer" or "no-buyer" based on the conversion rate, and each is randomly assigned a shopping time from the bell curve. As the simulations are computed, the number of buyers that arrive at the checkout lanes during each minute from minus 20 minutes to the present minute and from the present minute to plus 20 minutes is incremented or totaled at 70, and the totals for each minute divided by the maximum simulations (in this embodiment 200 simulations), to arrive at the total number of buyers arriving at the checkout lanes for each minute from minus 20 to plus 20 minutes (FIG. 4). After it has completed all simulations, the system clears the graphic display and sets up a new display which graphs the results of the simulations from minus 20 to plus 20 minutes. A typical such graph is shown in FIG. 8. So for each of the 40 minutes the system computes based on the simulations the number of buyers to arrive during each minute interval and plots the information on the graphic display.

One way to derive the shopping time bell curve disclosed in the parent is to use visual observation and to time shoppers in a variety of stores and under a variety of shopping conditions. Data representing the bell curve are in the computer file 20 and the computer randomly selects shopping times from the curve to assign to buyers entering the store. Other methods also may be used in creating a shopping time bell curve such as by comparing shopper traffic peaks entering the store with shopper traffic peaks exiting the store over a period of time using the recognition system 12.

In addition to producing a graphic display of predicted lane arrivals over a selected period, the system disclosed in the parent also computes the need for staffing changes at the checkout lanes in response to the predicted checkout lane traffic and other criteria. The display screen displays alert messages telling the operator whether staffing changes are needed. In predicting staffing changes several factors come into play. One such factor relates to the weight to be given the lane traffic data for each period of time for the time interval over which the lane traffic is displayed. It has been found that greater weight should be given to the lane traffic closer to the present time than to the lane traffic expected at times further in the future. Therefore, for purposes of determining whether to open or close checkout lanes, it has been found desirable to weight the averages in favor of those near the current time. Therefore, the invention disclosed in the parent weights the average lane traffic T1' for minus 5 to plus 4 minutes at 55%, the average traffic T2' for plus 5 to plus 9 minutes is weighted 30%, and the average traffic T3' for plus 10 to plus 14 minutes is weighted 15%. The sum of these produces a weighted average of lane traffic from minus 5 to plus 14 minutes. The system then predicts staffing requirements from a look-up table of staffing required for this weighted average traffic.

Although the comparison with the look-up table indicates a staffing change, it has been found desirable to make such a change only if the condition dictating the change has existed for some period of time. This prevents excessive staffing changes resulting from overreaction to temporary lane traffic of short duration. Thus, in a second embodiment of the invention disclosed in the parent, the staff requirement for the present minute is compared with the staff requirement for the prior two minutes. The system generates an alert message on the screen telling the operator to increase lane staffing as indicated by the present minute only if that staffing is greater than that of the prior two minutes. The system displays a message on the screen telling the operator to decrease the lane staffing only if the system indicates a staff level for this minute and the staff levels for the last eight consecutive minutes are less than the staff presently deployed. If these comparisons indicate that no staffing changes are required, the system displays a message to hold the present staffing.

The processing described is repeated in its entirety each current minute to generate an updated display each minute showing the lane traffic forecast and staffing requirements.

Figure 9A:
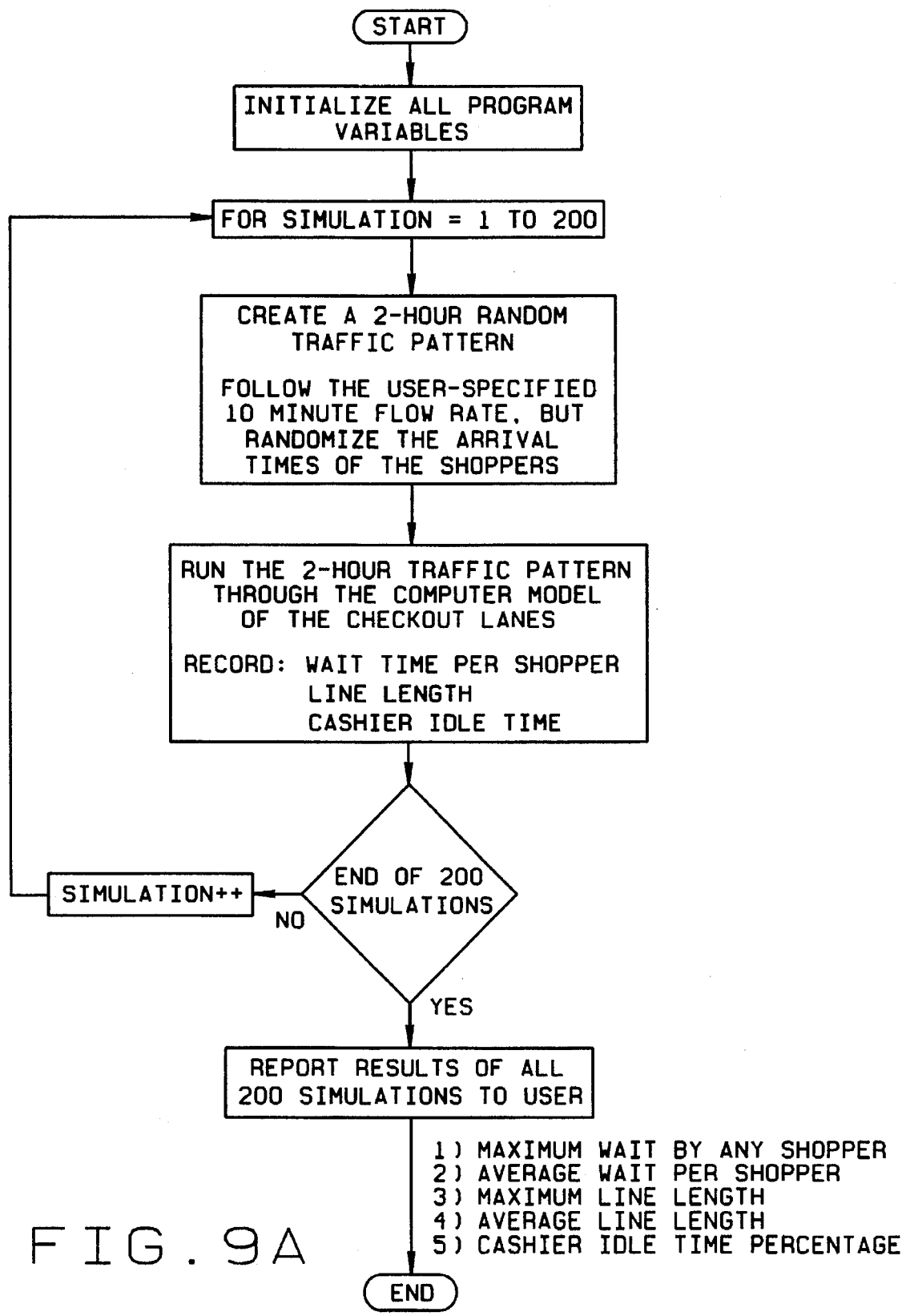
FIG. 9 is a flow diagram for use with the system of the invention disclosed in the parent for establishing a lookup table of checkout lane staffing requirements versus checkout lane staffing forecasts.
Figure 9B:
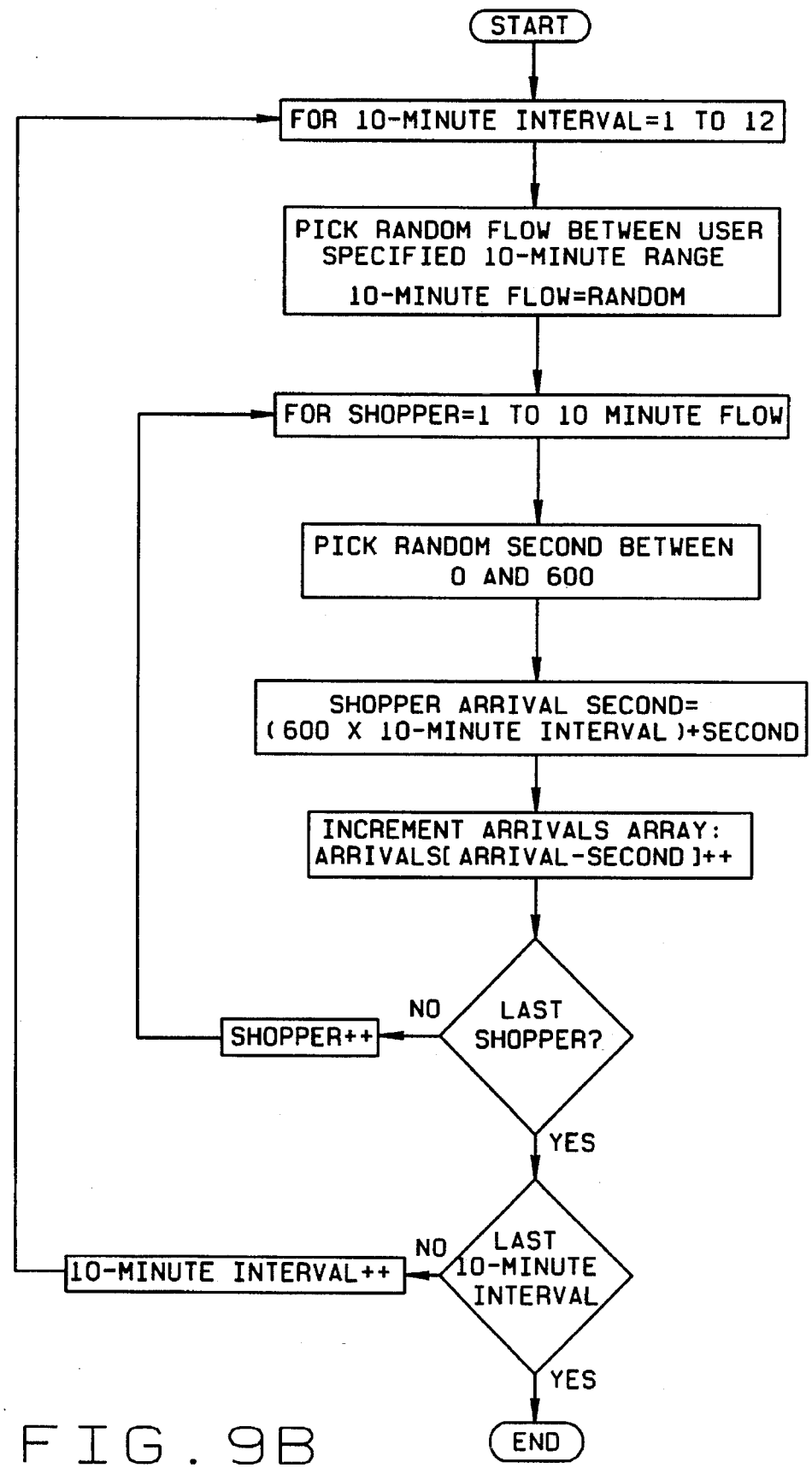
Figure 9C:
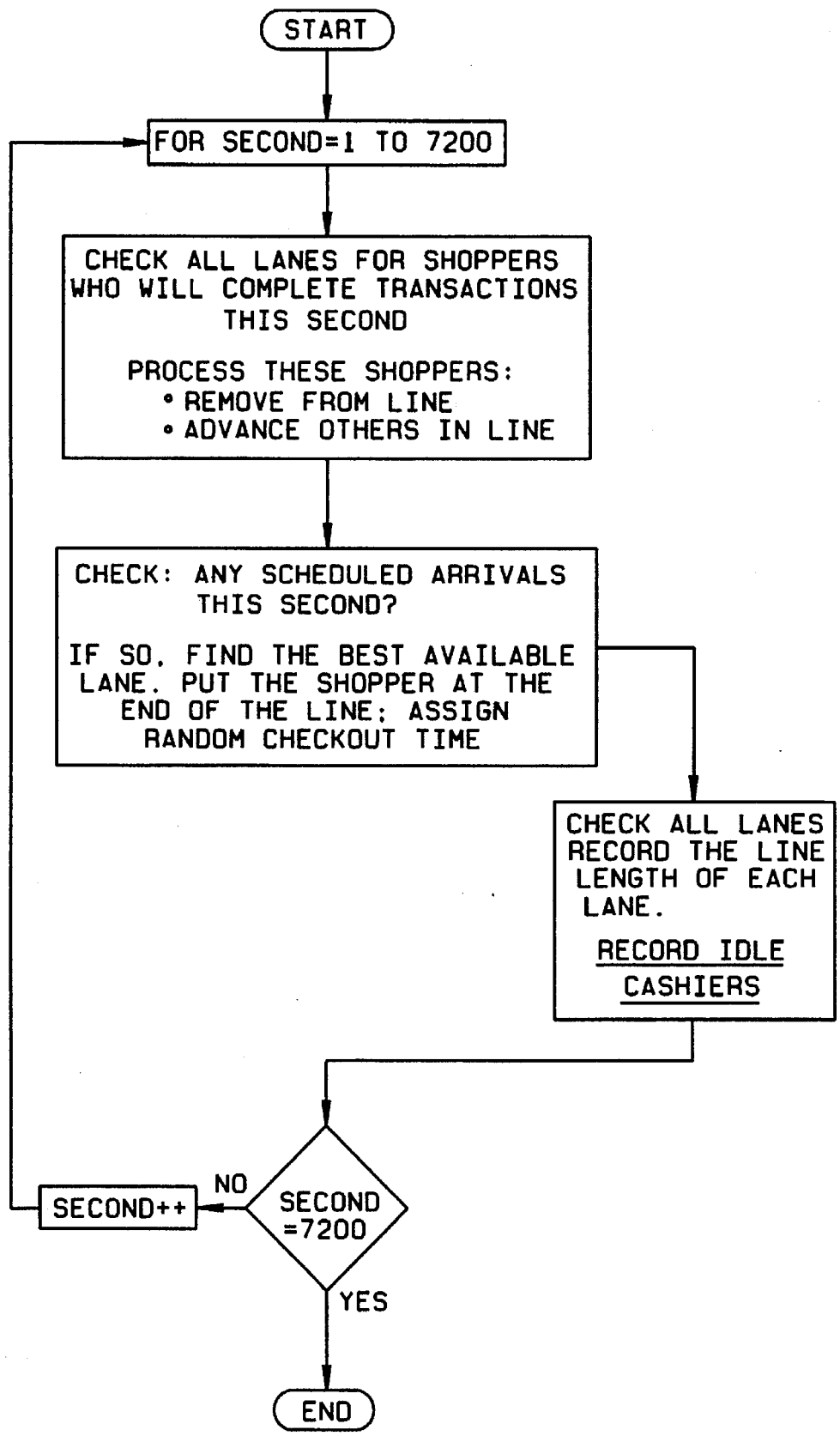

The lookup table for determining staff requirements as disclosed in the parent may be created from data generated from the off-line processing shown by the flow diagrams of FIG. 9. The staffing requirements for a particular store depend on the traffic lane forecast and certain "optimal" conditions for that store. These conditions include: the average time a buyer will wait in line at the checkout; the maximum wait a buyer will experience at the checkout; the maximum line length (number of people); percent cashiers' idle time. For example, a particular store may establish the following "optimal" parameters: on average a buyer should wait in line less than 30 seconds; the maximum wait in line should be less than five minutes; the maximum line length should be no more than four people; the percent idle time for the cashiers should be between 10–15%. These "optimal" conditions will vary depending on the store, time of day and other conditions.

Figure 7:
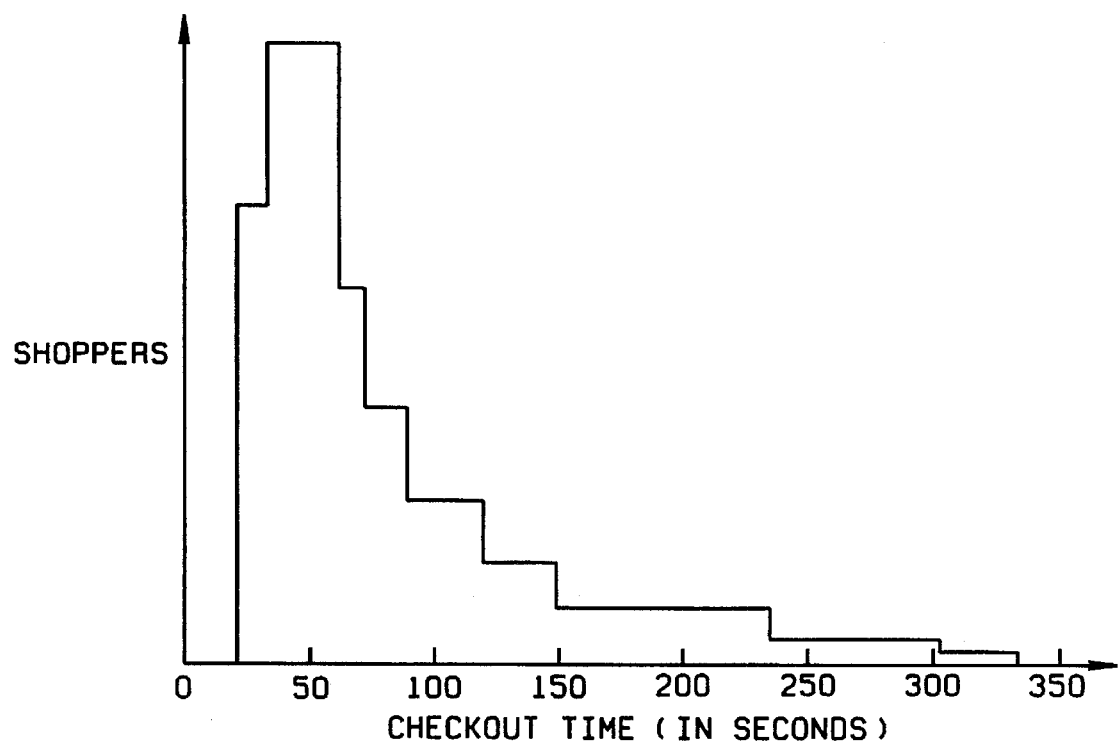
FIG. 7 is a typical frequency distribution of shopper checkout times used with the system of the invention disclosed in the parent.

For any given weighted average forecast of shopper traffic and for a given number of checkout lanes, the system disclosed in the parent generates information from which it can be determined whether the optimal conditions are satisfactorily met. It does so by generating many random shopper arrival patterns, and by randomly assigning a shopper checkout time (the time period it takes to check out once the shopper reaches the cashier) for each buyer from a frequency distribution of shopper checkout times such as shown in FIG. 7. The frequency distribution may be obtained from the store POS system which records the checkout transactions and includes data representing the durations of those transactions.

With reference to FIG. 9, the computer performs 200 simulations, all assuming the same weighted average shopper traffic (times 10) and a given number of open checkout lanes. A random traffic pattern is created over a specified time interval, which in this embodiment is selected as two hours. The system disclosed in the parent randomizes the arrival times of the shoppers and establishes an array of arrival times for each second during the two-hour period. It then performs a traffic simulation recording the wait time per shopper, the line length, and the cashier idle time. From the 200 simulations it reports: 1) the maximum time wait by any shopper; 2) average wait per shopper; 3) maximum line length; 4) average line length; and 5) cashier idle time percentage. This information is generated from numerous combinations of weighted average forecasts and open lanes from which a lookup table may be created of checkout lanes staffing versus weighted average lane traffic forecast with compliance or near compliance of "optimal" conditions.

The system disclosed in the parent may include any number of lane staffing lookup tables, each derived using a different frequency distribution of shopper checkout times, as the frequency distribution may vary depending on the time of day, which may be indicative of the fatigue of the checkout lane personnel, as well as other factors.

Figure 13:
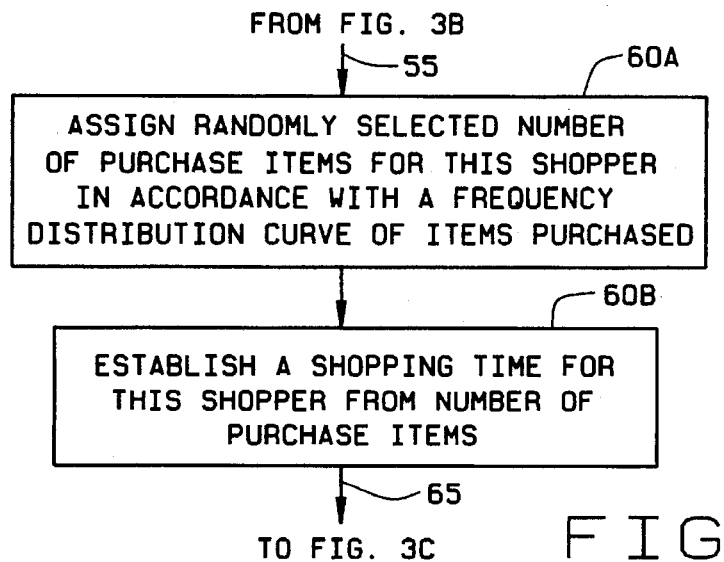
FIG. 13 is a flow diagram of the random assignment of shopping times to individual shoppers in accordance with the present invention.

The present invention improves on the invention disclosed in the parent by providing a checkout lane alert system which predicts checkout lane traffic in stores having both express checkout lanes and non-express checkout lanes. The preferred embodiment uses a modern supermarket as an example. The system of the present invention is indicated generally as 10' in FIG. 10. The system 10' comprises a shopper traffic recognition system 12', a computer 14' and a computer file 20' arranged similarly as in the parent. The software of the present invention performs random assignment of shopping times to individual shoppers (shown at 60 in FIG. 3C) in two steps, as shown in FIG. 13. First, at 60A, the software assigns to each shopper a number of items that each shopper will purchase. The number of items each shopper will purchase is a random variable selected based on a frequency distribution curve of items purchased by each shopper. This frequency distribution curve is typically a bell-shaped curve, representing for example that the probability of a shopper purchasing 10 items is higher than the probability of a shopper purchasing five items or 18 items.

The software next assigns, at 60B, a shopping time to each shopper. In the supermarket of the preferred embodiment, shopping time is largely a function of the number of items purchased. For a given number of items purchased in a given shopping trip, the range of shopping times is fairly well determined. For example, if 100 shoppers enter a supermarket at exactly the same time, and each has a list of exactly 10 items to purchase (each list being different), then those shoppers will find the items and arrive at the checkout lane within a short time of one another.

Therefore, knowing the frequency distribution of items per shopping trip allows the software to randomly assign a number of items purchased to each shopper, and from that calculate the estimated shopping times for each shopper. The software of the preferred embodiment uses specific multipliers that were taken from actual customer tests performed in stores. For instance, for purchases of between 6 and 10 items, the shopping time is calculated using the formula: shopping time=600 seconds+((items−5)×60 seconds). If the number of items purchased is 7, the equation results in a base shopping time of 12 minutes. However, the software assigns shopping times using a ±10% range. Thus, when the software chooses seven items for a shopper, the assigned shopping time will be a random number within the range: (12 minutes−10%=10:48 minutes) and (12 minutes+10%=13:12 minutes).

For other ranges of items purchased by a shopper, the formulas for calculating the shopping time differ slightly. Basically, as the number of items purchased grows larger, the amount of time allotted each individual item decreases. This conforms to shopping practice, since larger numbers of items implies that a person may select two or more of the same items, or may select more items from the same aisle.

Further, there are numerous frequency distribution curves of items purchased per shopper that can be used by the software. Based on the day of the week and the time of the day, the software (through a custom schedule file that describes the buying trends for an individual store) accesses different curves. For instance, early Saturday morning is a typical stock-up period in a supermarket where large numbers of items are purchased. The curve used for this period may be the curve where the average number of items is 35 items. Shoppers on Monday morning are less prone to be on stock-up trips, so the curve used for Monday morning may be a curve where the average is 14 items.

Figure 14:
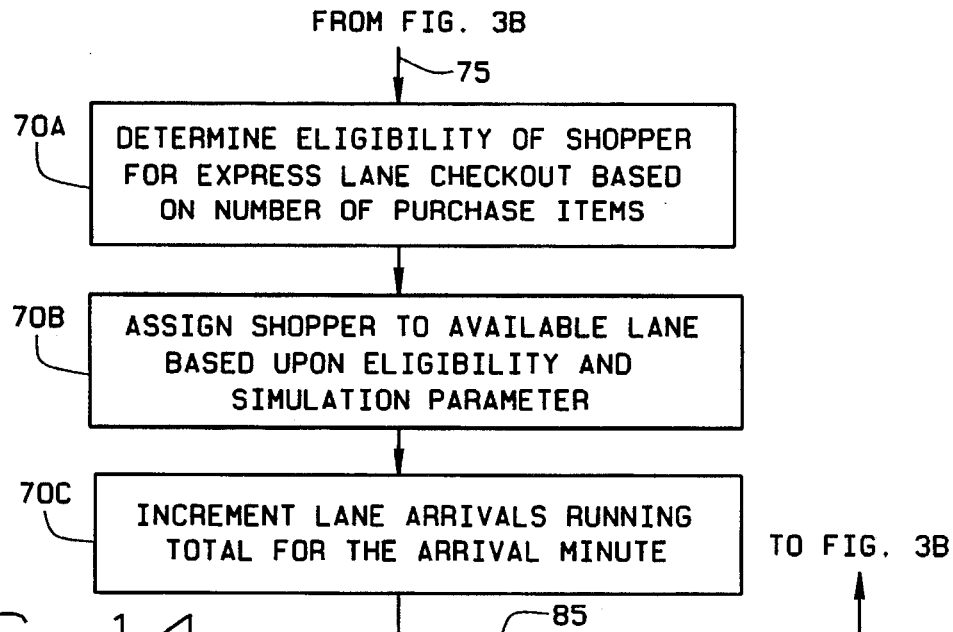
FIG. 14 is a flow diagram of the assignment of shoppers to express or non-express lane in accordance with the present invention.

As described above, the software of the present invention randomly assigns the number of items each shopper will purchase and from that calculates the shopping time. From this the checkout lane arrival time is easily calculated by adding the store entry time to the shopping time. When a shopper in a simulation "arrives" at the checkout lanes (as shown at 70 in FIG. 3C), two options are available: express checkout or non-express checkout. Shoppers with a predetermined number of items or fewer are "express-eligible" and may select an express lane, as shown in FIG. 14 at 70C. Shoppers with more than the pre-determined number of items must select non-express checkout. The software of the present invention treats the two lane types differently with respect to staffing criteria and traffic flow. The software checks each shopper's number of items purchased at 70B and the available checkout lanes at a given arrival minute and adds the particular shopper to either an express or non-express lane traffic for that minute at 70C.

While express lanes are designed to minimize checkout time for shoppers with relatively few items, not every "express-eligible" shopper will use an express lane. For example, if there are five people in line at the express lane and there are two non-express lanes with no one in line, then a shopper who is purchasing only a few items will likely use one of the non-express lanes. The software allows the end user to tailor the simulations in this respect. It provides a parameter to the simulation that dictates the percentage of express-eligible traffic that should be sent to the express lanes at 70B. For example, a supermarket manager may be content if 85% of the express-eligible traffic actually uses an express lane—the cost of providing express service to all of the express-eligible traffic may be too high.

Figure 15:
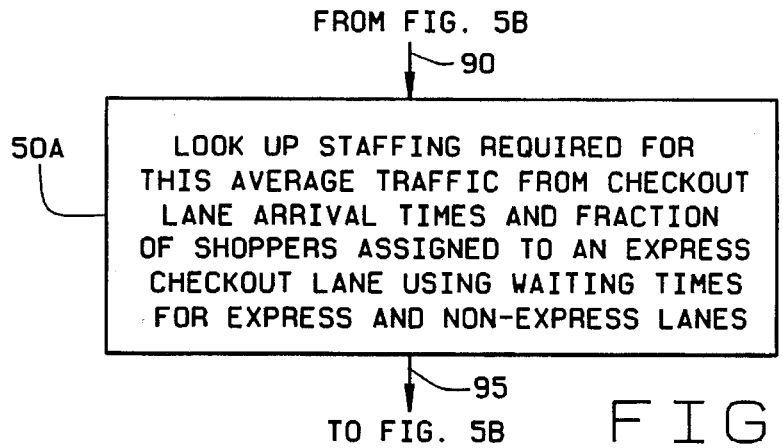
FIG. 15 is a flow diagram of the calculation of staffing required in accordance with the present invention.

The criteria used to calculate the staffing required for different incoming traffic flow rates at the checkout lanes (as shown at 50 in FIG. 5B) is different for express lanes and non-express lanes as shown at 50A in FIG 15 for the present invention. Shoppers who are making large purchases will be content to wait longer in line (within reason) than shoppers who are making small purchases. For this reason, when queuing simulations are run (off-line) to develop the staffing curves for the express lanes, the average wait per customer criteria used is less than the average wait per customer criteria used for non-express lanes. The output of the simulations are software tables used in the present invention to look up the required staffing for different traffic flow rates. Two tables are generated for each average transaction time curve—one for express lanes (low average waiting time) and one for non-express lanes (slightly longer average wait time).

Figure 12:
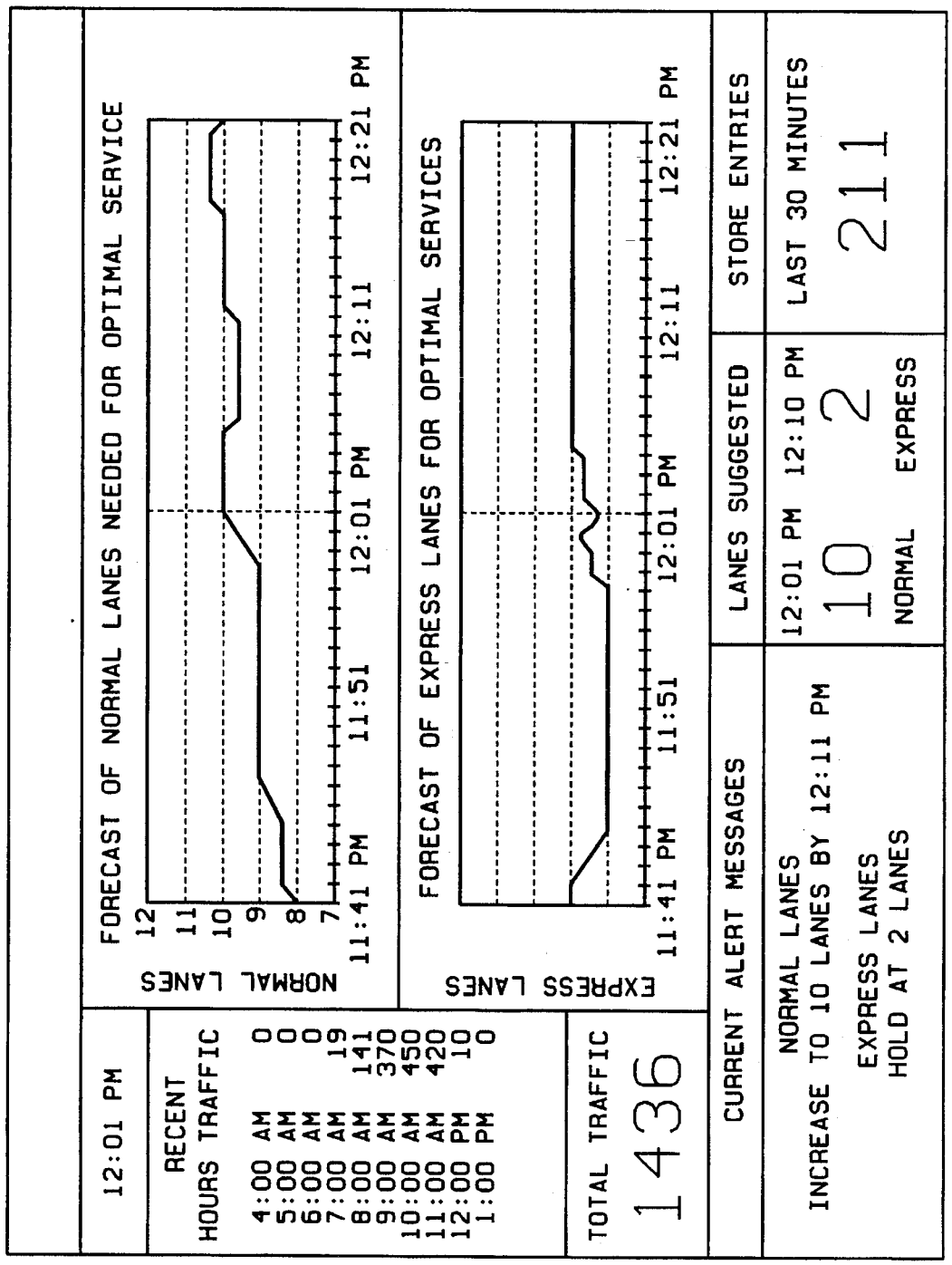

The computer screen graphically displays the express and non-express traffic lane forecasts. As such, the computer 14' in FIG. 10 is illustrated with two graphical displays. FIGS. 11 and 12 illustrate typical screen displays for the system of the present invention where graphic staffing forecasts for express and non-express checkout lanes are provided. In the preferred embodiment, hourly and daily traffic totals are provided as well as an alert message directing the operator wherever staffing changes are needed.

As illustrated in FIGS. 11 and 12, the lane traffic alert system 10' graphically displays the results of its checkout lane traffic simulations from minus 20 minutes to plus 20 minutes (relative to the present minute). Similar to the disclosure in the parent, the present invention operates to update shopper entry information from the recognition system 12' by computing, in real-time, a large number of simulations every minute to thereby update the graphic displays and lane traffic alert messages each minute.

During each update, the system goes back 60 minutes, and for each minute of the past 60 minutes the recognition system 12' has stored information on the shoppers who entered the store during that minute. For each shopper entering the store during each minute of the past 60 minutes the system pseudo-randomly assigns the number of items that each shopper will purchase, determines a shopping time, determines whether the shopper is express eligible or not, and adds the shopper to an appropriate checkout lane at the shopper's checkout lane "arrival" time. The system repeats this simulation a large number of times (200 in this preferred embodiment) every minute. During the many repetitions of the simulations, shoppers will be assigned different random combinations of items purchased, corresponding shopping times, etc. The final forecast is the average of these simulations. In other words, as the simulations are computed the number of shoppers who arrive at express and non-express checkout lanes during each minute from minus 20 minutes to plus 20 minutes (relative to the present minute) is incremented or totaled. The total for each minute is divided by the number of simulations (200 in this embodiment) to arrive at the checkout lane traffic for both express and non-express checkout lanes from minus 20 minutes to plus 20 minutes. After all simulations are complete, the system clears the existing graphic display and graphs a current display from minus 20 to plus 20 minutes.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A computer-implemented method of forecasting checkout lane traffic in a store including a recognition system having at least one sensor to recognize shoppers as they enter the store, the store including at least one express checkout lane, the method comprising the steps of:

(a) recognizing, via said at least one sensor, shoppers who enter the store during a time period of selected duration, said time period composed of time intervals of selected durations;

(b) generating data, via said recognition system, representing the entry time interval of said shoppers;

(c) transmitting said data representing the entry time interval of each shopper to a computer;

(d) designating, via said computer, a percentage of said shoppers as buyers based on a selected conversion rate;

(e) assigning to each of said buyers, via said computer, a randomly selected number of purchase items in accordance with a frequency distribution curve of items purchased;

(f) calculating, via said computer, from each randomly selected number of purchase items, a shopping time to be assigned to the corresponding buyer;

(g) establishing, via said computer, a checkout lane arrival time for each of said buyers based on the buyers's entry time interval and assigned shopping time; and (h) determining, via said computer, the eligibility of each of said buyers for express lane checkout in accordance with the corresponding number of purchase items assigned to each of said buyers;

(i) assigning, via said computer, at least a fraction of said buyers eligible for express lane checkout to an express checkout lane.

2. The method of claim 1 and further comprising the step of forecasting, via said computer, checkout lane traffic for a forecast period from the checkout lane arrival times and the fraction of said buyers assigned to an express checkout lane.

3. The method of claim 1 and further comprising the steps of repeating steps (d) through (i) to provide multiple simulations and forecasting checkout lane traffic as a function of said simulations.

4. The method of claim 2 and further comprising the steps of repeating steps (d) through (i) to provide multiple simulations and forecasting checkout lane traffic as a function of said simulations.

5. The method of claim 4 and further comprising the step of determining checkout lane staffing requirements, via said computer, from data generated as a function of a weighted average of the checkout lane arrival times of said buyers.

6. The method of claim 5 wherein different average wait time criteria for express and non-express checkout lanes are used to determine the respective checkout lane staffing requirements.

7. The method of claim 3 wherein, in each of the repetitions of steps (d) through (i), different randomly selected numbers of items purchased and correspondingly computed shopping times are assigned to corresponding ones of the buyers.

8. The method of claim 4 wherein, in each of the repetitions of steps (d) through (i), different randomly selected numbers of items purchased and correspondingly computed shopping times are assigned to corresponding ones of the buyers.

9. The method of claim 2 further comprising the step of producing, via said computer, a graphic display of said checkout lane traffic forecast.

10. A system for forecasting checkout lane traffic in a store having at least one express checkout lane, said system comprising:

a recognition system including at least one sensor to recognize shoppers who enter the store during a time period of selected durations, said recognition system generating data representing the entry time interval of each of said shoppers;

a communications link between said recognition system and a computer so that said entry time interval data may be transmitted to a computer; and said computer automatically designating a percentage of said shoppers as buyers based on a selected conversion rate and assigning a number of items purchased and a corresponding shopping time to each buyer, and automatically establishing, (a) a checkout lane arrival time interval based upon said buyer's entry time interval and assigned shopping time; and (b) a checkout lane type of express or non-express, based upon said buyer's number of items purchased;

so that checkout lane traffic may be forecast.

11. The system of claim 10 wherein said number of items purchased is generated randomly from a frequency distribution.

* * * * *